Nov. 23, 1965 L. B. ROBINSON ETAL 3,218,673
HOT PRESSING ZIRCONIA
Filed Sept. 26, 1963

INVENTORS
LAWRENCE B. ROBINSON
FRED W. VAHLDIEK
CHARLES J. LYNCH
BY
ATTORNEYS

United States Patent Office 3,218,673
Patented Nov. 23, 1965

3,218,673
HOT PRESSING ZIRCONIA
Lawrence B. Robinson, Yellow Springs, Fred W. Vahldiek, Dayton, and Charles T. Lynch, Fairborn, Ohio, assignors to the United States of America as represented by the Secretary of the Air Force
Filed Sept. 26, 1963, Ser. No. 311,923
2 Claims. (Cl. 18—34)
(Granted under Title 35, U.S. Code (1952), sec. 266)

The invention described herein may be manufactured and used by or for the United States Government for governmental purposes without payment to us of any royalty thereon.

This invention concerns the high-pressure, high-temperature shaping or forming of dense zirconium oxide bodies, at up to 30,000 atmospheres and 2,000° C., in process, in product, and in apparatus.

The object of this invention is the production of ceramic bodies that are close to the theoretical densities and that are of uniform microstructures, as are disclosed at page 479 in the Journal of Chemical and Engineering Data, vol. 7, No. 4, October 1962, that may be regarded as a part hereof.

The object of the invention broadly is the processing of refractory inorganic materials to high densities in producing a uniform, fine-grained structure, with or without stabilizing oxides. The process also assists in understanding the thermodynamic stability of zirconia in its monoclinic, tetragonal and cubic phases.

Figure 1:
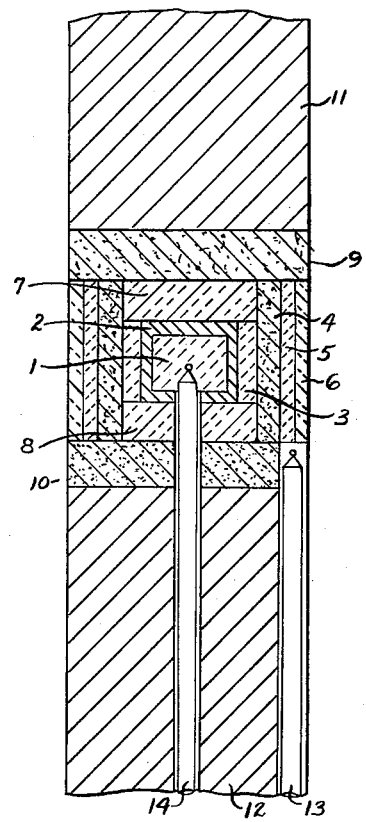
Figure 2:
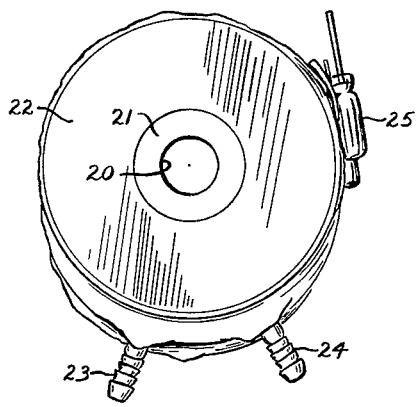

In the accompanying drawings:

FIG. 1 is an enlarged axial sectional view of the specimen within the forming cell; and FIG. 2 is a perspective view of the pressure cylinder within which the forming cell in FIG. 1 is positioned during the forming operation.

In the accompanying drawings, the specimen 1 illustratively is initially zirconium oxide of monoclinic structure, of 99.9% by weight reactor grade, experimentally containing 82 parts per million hafnium and less than 100 parts per million iron as major impurities, and powdered to −325 mesh pressed into cylindrical form and enclosed within a platinum cylinder.

All specimens of pure zirconia are prepared by pre-pressing the powder in 0.25 and 0.180 inch diameter dies at 2,600 atmospheres. The specimen is then enclosed in a container, such as the platinum tube 2 in FIG. 1 of the drawing, and is placed in the cell.

The cell comprises, in addition to the platinum tube enclosed specimen 1, in a radially outwardly moving direction, a first boron nitride insulation sleeve 3, a carbon-silicon carbide heater 4, a second boron nitride insulation sleeve 5, and a lava insulation sleeve 6. In the axial direction the specimen 1 in its platinum tube enclosure, is interposed between a pair of lava plugs 7 and 8 axially outwardly from which are a pair of carbon inserts 9 and 10 to complete the structure of the specimen enclosing cell.

The cell is shown in FIG. 1 as being positioned between a piston 11 and a closure 12 that together serve in applying compression forces from the piston to the closure through the cell that is disposed therebetween. The closure 12 is grooved axially along its surface to receive in an unstressed state at all times, Pt—Pt 10% Rh thermocouple 13. The closure 12 also contains an axially extending Ir—Ir 60% Rh thermocouple 14 that has its hot junction within the sample 1. The thermocouple 14 is removable to avoid its being stressed mechanically under some situations.

The cell that is illustrated in enlarged detail in FIG. 1 is adapted for being removably inserted into the orifice 20 that extends centrally and axially of the pressure cylinder 21. The pressure cylinder 21 is constructed of a high-speed tool steel that has been treated to a hardness of Rc 60/61. For pressures in the range of 20,000 to 30,000 atmospheres the pressure cylinder 21 illustratively may be made of tungsten-carbide.

The temperature of the pressure cylinder 21 is controlled in a suitable manner, as illustratively by means of an outer restraining ring 22 that is made of a desired alloy steel of an illustrative hardness of Rc 40/45, and a water jacket through which water is circulated continuously between the connections 23 and 24. Clamps 25 hold asbestos paper over the outer side of the water jacket.

The closure 12 occupies one end of the orifice 20, the cell is positioned on the closure 12 and the piston 11 delivers a desired hydraulic pressure on the end of the cell that is remote from the closure 12. The piston 11 and the closure 12 are made illustratively of tool steel that is comparable with the tool steel of which the pressure cylinder 21 is made.

Reaching and maintaining the temperatures here of interest requires a system that is insulated both electrically and thermally. Toward this objective a thin pyrophyllite sleeve, not shown, preferably is used to insulate the piston 11 and closure 12 from the cylinder wall that defines the orifice 20 by being positioned therebetween.

The internal resistance heater 4 may be made of one or more materials selected from the group that consists of carbon-silicon carbide and platinum—20% rhodium for developing temperatures up to 1,800° C.; or of selected grades of graphite for developing temperatures up to 2,000° C.

Protective heater insulation that is non-reactive with graphite at the temperatures maintained is required. Pyrophyllite is found to be a good pressure-transmitting medium and to provide good insulating properties. The temperture of pyrophyllite that is out of contact with the heater 4 at its maximum operating temperature, does not exceed 1,000° C. and at higher pressures its melting point is raised considerably. Boron nitride is resistant to reaction with the graphite to about 2,400° C., is machinable to close tolerances and its use as disclosed herein, is believed to be unique.

The inner thermocouple 14 is used for determining a family of temperature-calibration curve values for each material. During specimen runs at high pressures, the specimen temperature is determined by readings of the thermocouple 13 and the values are applied to the previously prepared calibration curves made from readings from both theromocouples.

In making a run the sample or specimen is placed in the apparatus, and the force applied to the sample is slowly raised to 50 tons. The force is supplied from a hydraulic press and is applied by the piston 11 to the specimen 1 supported by the closure 12. Fifty tons is equivalent to 18,000 atmospheres ±200 atmospheres. The pressure of 50 tons is held for about 5 minutes and then is slowly released, returning the sample to atmospheric conditions.

This procedure is repeated and the sample is heated at the rate of about 100° C. per minute until it arrives at about 1,200° C. At 1,200° C. the pressure is increased slowly to 18,000 atmospheres, as the temperature is held at 1,200 ° C. This pressure is maintained as the temperature is again increased by 100° C. increments per minute to 1,800° C. The temperature is held at 1,800° C. and the pressure is held at 18,000 atmospheres for 15 minutes, or for up to an hour if preferred.

The temperature is then dropped slowly to 1,200° C., at which temperature the pressure is slowly released with a rise in temperature. The temperature is further increased to 1,800° C. and is maintained for ten minutes while still under reduced pressure. The pressure is again increased to 18,000 atmospheres and the heating power is shut off, thereby quenching the sample at high pressure. When the die has cooled to room temperature, the pressure is slowly released and the sample is removed.

The resultant sample is hard, dense and is translucent. Zirconia made by this process is close to the theoretical density, it has a uniform microstructure, and has a fine grain size.

The high-pressure zirconia bodies were tested for thermal shock resistance by cycling through the monoclinic-tetragonal phase transformation which occurs between 1,100° C. and 1,250° C. with substantial transformation at 1190° C. to 1200° C. Specimens are quenched from 1,350° C. to room temperature of 72° F. or 22° C.

The thermal shock resistance of the samples is far superior to that of pure zirconia made by other processes. X-ray diffraction patterns show that the tetragonal phase has been quenched-in under pressure as a metastable phase present in addition to the monoclinic phase at room temperature.

Spectrographic analysis of the zirconia indicates a typical pick-up of about 0.05% impurities, mainly Al and B.

Useful range of producing a good body is 1,200° C. to 2,000° C., at pressures of from 10,000 to 30,000 atmospheres. Both pure zirconia and zirconia stabilized with other oxides, such as calcia and yttria are made.

In general, temperatures that are sufficiently high for accomplishing rapid diffusion within the sample also requires a few minutes at high pressure. The simultaneous application of high temperature and high pressure, or the application of pressure followed by heating and quenching under pressure and then releasing the pressure, provide good samples.

The method disclosed herein is applicable also to a wide variety of refractory inorganic materials, such as the oxides: hafnia, titania, silica, alumina, magnesia, etc.; the borides: titanium diboride, zirconium diboride, hafnium diboride, tantalum diboride, etc.; the carbides: titanium carbide, hafnium carbide, zirconium carbide, tantalum carbide, silicon carbide, etc.; the nitirdes; titanium nitride, hafnium nitride, zirconium nitride, tantalum nitride, aluminum nitride, etc., and the silicides: molybdenum disilicide, tungsten disilicide, zirconium disilicide, hafnium disilicide, etc.

It is to be understood that the examples and the process steps that are disclosed herein are submitted as being successfully operative embodiments of the present invention, and that similarly operative substitutions and modifications may be made therein without departing from the spirit and the scope of the present invention.

We claim:
1. The apparatus for making a hard and dense refractory inorganic material specimen of uniform and fine-grained structure close to the theoretical density of the material and of uniform microstructure and of fine-grain size comprising a specimen enclosing cell removably insertable within a pressure cylinder, the cell comprising a platinum tube for enclosing the specimen, a first boron nitride insulation sleeve disposed laterally around the tube, a carbon-silicon carbide heater disposed laterally around the first insulation sleeve, a second boron nitride insulation sleeve disposed laterally around the carbon-silicon carbide heater, a lava insulation sleeve disposed laterally around the second boron nitride sleeve, a pair of lava plugs disposed on the axially opposite sides of the platinum enclosed specimen, and a pair of carbon inserts on the axially opposite sides of the pair of lava plugs.

2. The apparatus for making a hard and dense refractory inorganic material specimen of uniform and fine-grained structure close to the theoretical density of the material and of uniform microstructure and of fine-grain size comprising a specimen enclosing cell removably insertable within a pressure cylinder, the cell comprising a closed platinum tube for surrounding the specimen, a first boron nitride insulation sleeve disposed laterally around the tube, a carbon-silicon carbide heater disposed laterally around the first insulation sleeve, a second boron nitride insulation sleeve disposed laterally around the carbon-silicon carbide heater, a lava insulation sleeve disposed laterally around said second boron nitride sleeve, said first carbon-silicon carbide heater, said second boron nitride sleeve and said lava insulation sleeve being of a length greater than the length of said platinum tube and said first boron nitride insulation sleeve, a pair of lava plugs disposed on the axially opposite sides of the platinum enclosed specimen, said pair of lava plugs being of such thickness that together with the length of said platinum tube and said first boron nitride insulation sleeve the total length equals that of said carbon-silicon carbide heater, said second boron nitride sleeve and said lava insulation sleeve, and a pair of carbon inserts on the axially opposite sides of the pair of lava plugs.

References Cited by the Examiner

UNITED STATES PATENTS

| | | | |
|---|---|---|---|
| 2,535,180 | 12/1950 | Watson | 264—332 |
| 2,538,959 | 1/1951 | Ballard | 264—332 |
| 2,922,710 | 1/1960 | Dombrownski et al. | |
| 2,941,250 | 6/1960 | Hall | 18—34 |
| 2,996,763 | 8/1961 | Wentrof. | |
| 3,030,662 | 4/1962 | Strong | 18—34 |
| 3,067,467 | 12/1962 | Gardini et al. | 18—16.5 |
| 3,075,245 | 1/1963 | Bundy. | |
| 3,084,388 | 4/1963 | Ballhausen. | |
| 3,088,169 | 5/1963 | Wentrof | 18—16 |
| 3,096,544 | 7/1963 | Lundblad | 18—16.5 |
| 3,108,325 | 10/1963 | Harvey | 18—16.5 |
| 3,137,896 | 6/1964 | Daniels | 18—16.5 |

FOREIGN PATENTS 1,136,312  9/1962  Germany.

OTHER REFERENCES

Resistance of 72 Elements Alloys and Compounds to 100,000 kg./cm.$^2$—P. W. Bridgeman.

Proceedings of American Academy of Arts and Sciences, March 1952, vol. 81, #4, pages 169–175.

WILLIAM J. STEPHENSON, *Primary Examiner.*

ALEXANDER H. BRODMERKEL, *Examiner.*